C. I. HALL.
ELECTRICITY MEASURING INSTRUMENT AND TIMING DEVICE THEREFOR.
APPLICATION FILED JUNE 18, 1913.
1,217,302.
Patented Feb. 27, 1917.
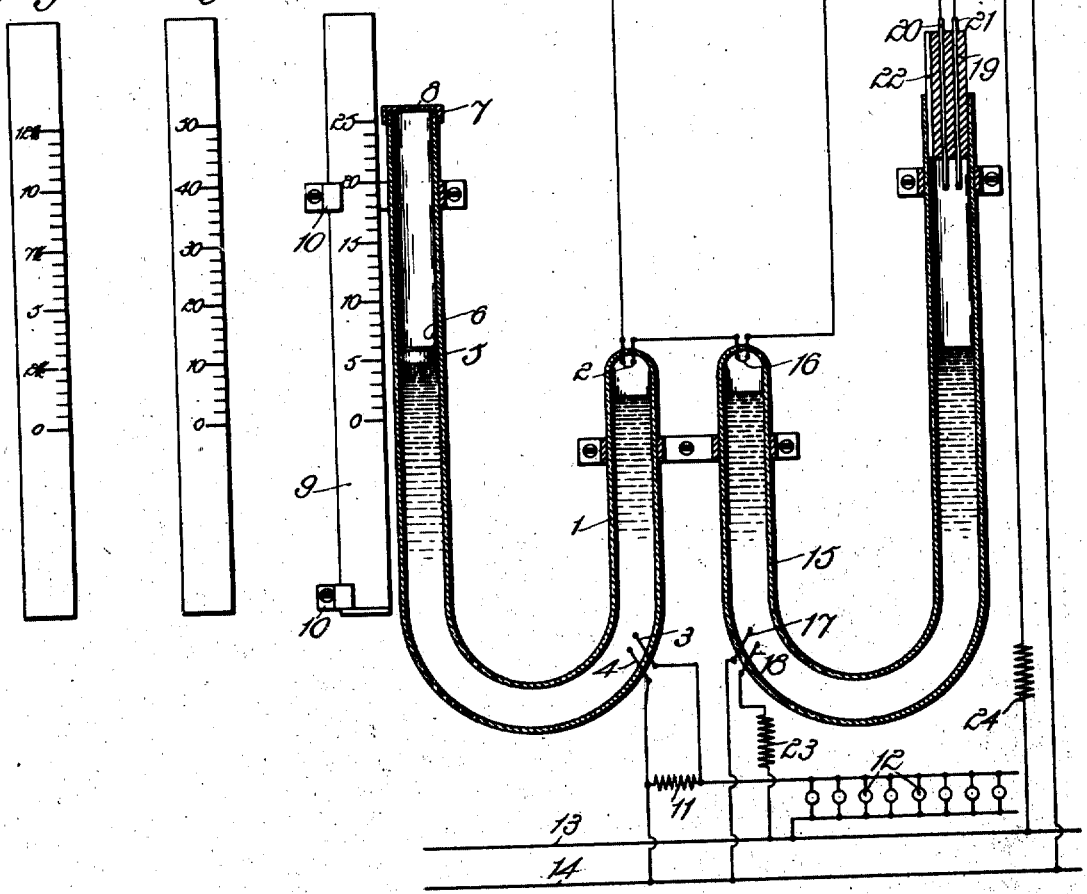
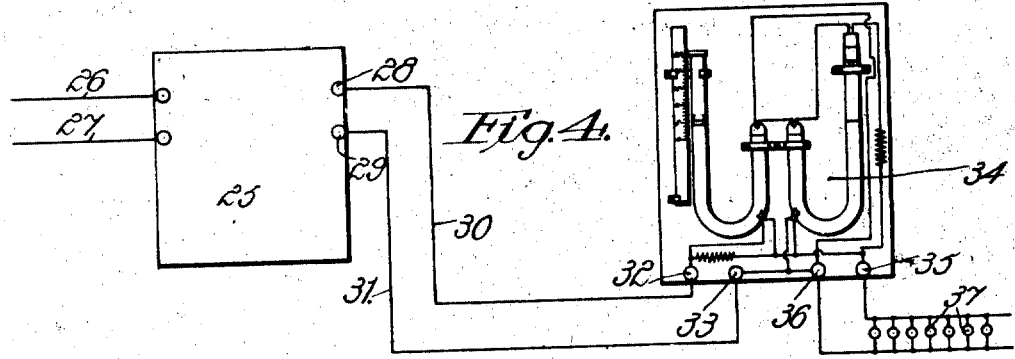
Witnesses:
Robert F. Brack
August Arndt
Inventor
Chester I. Hall
By Brown Williams Bell Hanson & Boettcher
Attorneys

UNITED STATES PATENT OFFICE.

CHESTER I. HALL, OF CHICAGO, ILLINOIS, ASSIGNOR TO CHICAGO ELECTRIC METER COMPANY, OF CHICAGO, ILLINOIS, A CORPORATION OF ILLINOIS.

ELECTRICITY-MEASURING INSTRUMENT AND TIMING DEVICE THEREFOR.

1,217,302.  Specification of Letters Patent.  Patented Feb. 27, 1917.

Application filed June 18, 1913. Serial No. 774,292.

*To all whom it may concern:*

Be it known that I, CHESTER I. HALL, a citizen of the United States, residing at Chicago, in the county of Cook and State of Illinois, have invented certain new and useful Improvements in Electricity-Measuring Instruments and Timing Devices Therefor, of which the following is a full, clear, concise, and exact description, reference being had to the accompanying drawings, forming a part of this specification.

My invention relates to an improved form of electricity measuring devices and timing devices therefor, in which mechanical gearing and rotating parts are entirely done away with and the measuring is accomplished by extremely simple devices in an accurate manner.

My invention operates on the electrolytic principle, and in connection therewith I provide means for periodically restoring the device to its initial condition, as a result of which the mechanism not only indicates the current or energy flowing through an electric circuit in a given time, but also indicates the maximum amount of current or energy flowing for any one of a successive number of equal intervals of time, the timing being determined by a device also operating on the electrolytic principle. By my invention, both the measuring and timing operations are the result of, first, the electrolytic decomposition of an acid solution, and the subsequent combination of the gases formed by the electrolytic action; the subsequent combination being controlled by certain connections and igniting apparatus so related as to be effective at the ends of recurring intervals of time.

The several drawings illustrating my invention are as follows:

Figure 1 shows in elevation, partially in section and diagrammatic circuit connections, the apparatus as connected for measuring the maximum demand of current or energy flowing in a circuit;

Figs. 2 and 3 show modified scale constructions for different conditions of voltage and time intervals; and Fig. 4 is a diagrammatic circuit drawing showing the connection of my measuring devices used for indicating the maximum demand for any one of recurring intervals connected to a regular electricity meter.

Similar numerals refer to similar parts throughout the several views.

As shown in Fig. 1, the mechanism consists of a U-tube 1 hermetically sealed at its smaller end, with a hot-wire filament 2 sealed inside of the end of the tube. At the lower portion of the shorter leg of the tube, two electrodes 3 and 4 are sealed in the wall of the tube so as to project into the tube a sufficient distance to produce an electrolytic action of the solution in the tube when current is caused to flow from one electrode to the other. The longer leg of the tube has disposed in it, and resting upon the surface of the solution in the tube, a very light float 5, which may be of cork or similar material, which has secured to its upper surface a light spring 6 for retaining the float in any position to which it may be raised by the liquid in the longer leg of the U-tube. This longer leg is covered with a cap 7 provided with a central perforation 8 to permit the float 5 to readily rise in the longer leg as the gases are formed in the shorter leg and the liquid is displaced in the shorter leg into the longer leg of the U-tube. A scale 9 is supported adjacent to the longer leg of the U-tube by means of suitable clips 10, 10, and is so disposed that the zero of the scale is even with the bottom of the float 5 when the shorter leg of the U-tube is filled with the acid solution. This acid solution is preferably a ten per cent. sulfuric acid solution, so that it is a comparatively good conductor between the electrodes 3 and 4. These electrodes are connected with the terminals of a shunt 11, which is connected in circuit with the load 12 upon the electric feeders 13 and 14. In the present case, this load 12 is represented as a lamp load, although it is apparent that the measuring device will operate equally well if the load takes any other form. Furthermore, while the electrodes 3 and 4 are shown as connected with a shunt 11, it will be understood that a current transformer may be used if desired in connection with alternating current work.

A second, somewhat similar, U-tube 15 is also mounted in vertical position, as indicated, and has its shorter leg constructed in a manner very similar to that shown and described for the U-tube 1, there being a hot-wire filament 16 sealed into the hermetically-closed end of the shorter leg, and electrodes 17 and 18 hermetically sealed into the side wall of the tube at the lower end of the shorter leg. The longer leg of the U-tube 15 has mounted in it a plunger 19 of insulating material, through which two electric terminals 20 and 21 extend, projecting a sufficient distance downward so as to be engaged by the solution in the U-tube when it has been sufficiently displaced from the shorter leg so as to reach the lower ends of these terminals 20 and 21. These terminals, as well as the electrodes referred to, are preferably made of platinum, so that the contact with the solution shall be very good, that they may be sealed readily in the glass of the tubes and further, so that they will not be corroded by the acid. The plunger 19 is provided with a goove 22 along one of its sides, so that the solution in the longer leg may move readily upward and downward according as the gases are formed in the shorter leg, or recombined by the action of the hot filament 16. By moving the plunger 19 up or down, it will be observed that the terminals 20 and 21 are brought into engagement with the solution for different amounts of gases collected in the upper end of the shorter leg of the U-tube 15. The terminals 17 and 18 are connected with the line wire 14 and one terminal of a high resistance 23, the other terminal of which is connected with the other line wire 13. As a result, the electrodes 17 and 18 have a current flowing between them which is proportional to the voltage or pressure between the line wires 13 and 14, and the electrodes 3 and 4 have a current flowing between them which is proportional to the load current.

The operation of the apparatus described is as follows:

At the beginning of the measuring operation the shorter leg of each U-tube is completely filled with the acid solution. Then electrolytic action takes place between the terminals 3 and 4 proportional to the amount of load current, and hydrogen and oxygen gases are liberated and accumulate in the upper end of the shorter leg of the U-tube 1 around the hot-wire filament 2 in proportion to the load current. At the same time current flows between the electrodes 17 and 18, producing an electrolytic action proportional to the voltage or pressure between the line wires 13 and 14, and as a result of the electrolytic action, hydrogen and oxygen gases are formed in the upper end of the shorter leg of the U-tube 15 around the hot-wire filament 16. As the gases accumulate in the U-tube 1, the float 5 is raised a corresponding amount, and as the gases accumulate in the U-tube 15, the level of the acid solution in the longer leg is raised a corresponding amount. This action continues until the acid solution in the U-tube 15 comes in contact with the lower ends of the terminals 20 and 21, at which time a circuit is closed from the line wires 13 and 14 through the resistance 24, since, as indicated, this resistance, the terminals 20 and 21, and the hot-wire filaments 2 and 16 are connected together in series between the line wires 13 and 14. As a result of the closure of this circuit, current is caused to flow through the hot-wire filaments 2 and 16, which, by becoming red-hot, ignite the gases surrounding them to again form the water which was originally decomposed to form these gases. As a result, the acid solution in each tube at once moves upward in the shorter leg of the tube to completely fill it, and in the U-tube 1 the float 5 is left in its elevated position as a result of the action of the spring 6, while the solution in the longer leg of the U-tube 15 at once drops below the lower ends of the terminals 20 and 21, thus breaking the circuit through the hot-wire filaments 2 and 16.

It will at once be seen that as the voltage upon the line wires 13 and 14 is practically constant, the rate of production of the gases in the tube 15 is proportional to time, and that therefore the U-tube 15 constitutes a timing element for determining the length of time that the gases are allowed to collect in the U-tube 1, and further that this time interval may be varied by moving the plunger 19 up or down in the longer leg of the U-tube 15.

From the description above given, it will appear that the U-tube 1, with its float 5 and scale 9, constitute, when controlled by the timing device referred to, a maximum demand indicator, which shows the maximum amount of electrical demand made upon the line wires 13 and 14 by the load 12 either in current-time units or energy-time units, since the voltage, being a practically constant quantity, may be incorporated in the reading by properly calibrating the scale 9. In other words, to read current-time units one scale is used, and to read energy-time units another scale is used, in which each scale division has a value representing the product of the unit of current by the voltage on the main line 13 and 14.

As the operation above described is repeated, it will at once be apparent that, for any time interval when the load is not as great as for a previous time interval, the float 5 will not be disturbed during that interval, but that, on the other hand, it will at all times be in a position to indicate upon the scale 9 the maximum amount of current-time units or energy-time units required by the load during any one of the preceding time intervals during which the device was in operation since the returning of the float 5 to its zero position. This act of returning the float 5 to its zero position is provided for by the cap 7, for by removing the cap the float may readily be moved downward into engagement with the surface of the solution.

Fig. 2 represents a different graduation of scale from Fig. 1, as, for example, if the scale shown in Fig. 1 is understood to be graduated in energy-time units for a certain voltage upon the main line, the scale shown in Fig. 2 will represent the graduation required for energy-time units for twice as great a voltage upon the main line feeders 13 and 14; or the scale shown in Fig. 2 might be employed for the same voltage to indicate energy-time units if the time interval determined by the U-tube 15 were one half of that required to be used with the scale shown in Fig. 1.

The scale shown in Fig. 3 illustrates the change required to be made, again assuming the base of energy-time units, if the voltage were one half of that assumed for the scale shown in Fig. 1; or, assuming the voltage to be the same, if the time interval were twice that assumed for the scale indicated in Fig. 1.

The mechanism shown and described in Fig. 1 may be connected with a standard electricity meter, as indicated in Fig. 4. In this figure the meter, which is assumed to be of the integrating type, and which may be either an integrating ammeter or an integrating wattmeter, is indicated at 25, the line wires 26 and 27 being connected with it as indicated. The load terminals 28 and 29, instead of being connected with the load, are connected by wires 30 and 31 with the supply terminals 32 and 33, respectively, of the maximum demand instrument, which is indicated as a whole by the numeral 34. The load terminals 35 and 36 of the maximum demand instrument 34 are connected with the load 37 as indicated. The circuit connections of the maximum demand instrument 34 are precisely the same as those shown and described above in connection with Fig. 1.

Fig. 4 merely illustrates the simplicity of connecting in circuit the maximum demand instrument 34 with an electricity meter of standard construction, since the construction of the integrating meter is not changed in any particular, all that is required being that the maximum demand instrument be inserted in the load circuit in the manner indicated.

It will be understood that, while I have shown the U-tube 15 as a timing device for determining the successive intervals of operation of the maximum demand tube 1, this U-tube 15 may be used for other purposes than controlling the action of such a maximum demand tube, and that, in fact, it may be used for timing generally wherever a practically constant voltage is available to cause the electrolytic action, and that the device controlled by the timing operation may be of any kind desired, as the controlling medium may readily be inserted in the circuit connected with the hot-wire filament 16 and caused to operate, either directly or indirectly, by the current flowing in said circuit.

While I have shown my invention in the particular embodiments herein described, I do not, however, limit myself to these ways of carrying out my invention, as I may make many modifications therein without departing from the spirit of my invention.

What I claim is:

1. In an instrument for determining the maximum electrical demand of a circuit, the combination of a first electrolytic device actuated proportionally to current flow, an indicator the operation of which is effected by the aforesaid electrolytic device, a second electrolytic device actuated substantially proportionally to time, and connections between said electrolytic devices by which the operation of the second device restores the first device to its initial condition.

2. In an instrument for determining the maximum electrical demand of a circuit, the combination of a first electrolytic device actuated proportionally to current flow, an indicator operated by said first electrolytic device, a second electrolytic device actuated substantially proportionally to time, and connections between said electrolytic devices by which the operation of the second device restores both of said devices to their initial conditions at regular time intervals.

3. In an instrument for determining the maximum electrical demand of a circuit, the combination of a first device actuated proportionally to current flow, an indicating device for registering the operation of said first device, a second device actuated substantially proportionally to time adapted to determine intervals of time by successive interrupted operations, and circuit connections controlled by the second device extending between said first and second devices whereby said first device is periodically returned to its initial condition.

4. In an instrument of the class described, the combination of a first device actuated proportionally to current flow, an indicating device for registering the operation of said first device, a second device actuated by a practically constant voltage for determining intervals of time, and circuit connections controlled by one of said devices extending between said first and second devices whereby both of said devices are periodically returned to their initial condition.

5. In an instrument for determining the maximum electrical demand of a circuit, the combination of a first device actuated proportionally to current flow, an indicating device for registering the maximum operation of said first device, a second device actuated by a practically constant voltage for determining intervals of time, and circuit connections controlled by one of said devices extending between said first and second devices whereby both of said devices are periodically returned to their initial condition without moving said indicator from the position of maximum registration to which it has been moved.

6. In an instrument for determining the maximum electrical demand of a circuit, the combination of a U-tube hermetically sealed at one end, an electrolyte in said tube, an igniting device inside of the tube at its sealed end, electrodes in the tube near the bottom of the sealed leg of the tube, a device for periodically actuating the igniting device to combine the gases collected in the closed leg of the U-tube and means for registering the highest electrolyte level attained in the other leg of the U-tube.

7. In an instrumnt for determining the maximum electrical demand of a circuit, the combination of a U-tube hermetically sealed at one end, an electrolyte in said tube, an igniting device inside of the tube at its sealed end, electrodes in the tube near the bottom of the sealed leg of the tube, a device for periodically actuating the igniting device to combine the gases collected in the closed side of the U-tube, a float in the other side of the U-tube, and a device for holding the float in the highest position to which it is moved.

8. In an instrument for determining the maximum electrical demand of a circuit, the combination of a U-tube hermetically sealed at one end, an electrolyte in said tube, an igniting device inside of the tube at its sealed end, electrodes in the tube near the bottom of the sealed leg of the tube, a device for periodically actuating the igniting device to combine the gases collected in the closed side of the U-tube, means for registering the highest electrolyte level attained in the U-tube, a second U-tube having one of its ends hermetically sealed, an electrolyte in said second tube, electrodes in said second tube near the lower ends of the sealed side thereof, and circuit terminals in the other leg of said second tube for controlling the operation of the igniting device in the first-mentioned U-tube.

9. In an instrument for determining the maximum electrical demand of a circuit, the combination of a U-tube hermetically sealed at one end, an electrolyte in said tube, an igniting device inside of the tube at its sealed end, electrodes in the tube near the bottom of the sealed leg of the tube, means for registering the highest electrolyte level attained in said tube, a second U-tube having one of its ends hermetically sealed, an electrolyte in said second tube, electrodes in said second tube near the lower end of the sealed side thereof, an igniter device inside of the sealed end of said second U-tube, and circuit terminals in the other leg of said second tube for controlling the operation of the igniting devices.

10. In an instrument for determining the maximum electrical demand of a circuit, the combination of a U-tube hermetically sealed at one end, an electrolyte in said tube, an igniting device inside of the tube at its sealed end, electrodes in the tube near the bottom of the sealed leg of the tube, a second U-tube having one of its ends hermetically sealed, an electrolyte in said second tube, electrodes in said second tube near the lower end of the sealed side thereof, an igniter device inside of the sealed end of said second U-tube, and circuit terminals in the other leg of said second tube for controlling the operation of the igniting devices, a float in the unsealed side of the first-mentioned U-tube, a device for holding said float in the highest position to which it is moved, and a scale for indicating the value of the position of said float.

11. Apparatus of the class described comprising a U-shaped tube hermetically sealed at one end, an electrolyte in said tube, an igniter device located in the sealed end of said tube, electrodes near the bottom of the sealed leg of said tube, means controlling the actuation of said igniter device, and means for registering the greatest height attained by the electrolyte due to the formation of gas in the sealed leg of the tube.

12. Apparatus of the class described comprising a U-shaped tube hermetically sealed at one end, an electrolyte in said tube, an igniter device located inside the sealed end of said tube, electrodes near the bottom of the sealed leg of said tube, circuit connections for maintaining a practically constant current flow between said electrodes, a plunger slidably mounted in the unsealed leg of said tube, and circuit terminals carried by said plunger for controlling the operation of said igniter device, the position of said plunger determining the length of the time intervals between actuations of the igniter device.

13. In an instrument for determining the maximum electrical demand of a circuit, the combination of a U-tube hermetically sealed at one end, an electrolyte in said tube, electrodes in the tube near the bottom of the sealed leg of the tube, an igniting device to combine the gases collected in the closed side of the U-tube, a second U-tube having one of its ends hermetically sealed, an electrolyte in said second tube, electrodes in said second tube near the lower end of the sealed side thereof, and circuit terminals in the other leg of said second tube for controlling the operation of the igniting device in the first-mentioned U-tube, said circuit terminals mounted in a sliding plunger movable to different positions in said second U-tube to change the time intervals of operation determined by said second U-tube.

14. Apparatus capable of indicating the greatest amount of electricity consumed during a number of equal intervals of time comprising a U-tube, an electrolyte in said tube, one end of said U-tube being hermetically sealed, means for decomposing the electrolyte in the sealed leg of the tube at a rate proportional to the consumption of electricity, means for causing the gases of electrolysis to return to their normal state at recurring time intervals, and means for registering the greatest height attained by the electrolyte in the unsealed leg of the tube.

15. Apparatus capable of indicating the greatest amount of electricity consumed during a period of equal time intervals comprising a U-tube having one end thereof hermetically sealed, an electrolyte in said tube, means for decomposing the electrolyte at a rate proportional to the consumption of electricity whereby gases accumulate in the sealed end of the tube and the electrolyte level rises in the unsealed end of the tube, means for causing the gases of electrolysis to return to their former state at regularly recurring intervals of time, a float in the open end of the U-shaped tube, and means for retaining said float at the highest point to which it is carried when the electrolyte level rises within the open end of the U-shaped tube.

16. In an instrument for determining the maximum electrical demand of a circuit, the combination of an electrolyte container, an electrolyte in said container, said container conformed to provide two chambers above the electrolyte therein, one of said chambers being sealed against communication with the atmosphere, an igniting device in said sealed chamber, electrodes immersed in the electrolyte arranged to generate a supply of gas in said sealed chamber and thus change the electrolyte levels in said chambers, means for periodically operating the igniting device to combine the gases collected in the aforesaid sealed chamber, and means for registering the highest electrolyte level attained in the other chamber.

17. In an instrument for determining the maximum electrical demand of a circuit, the combination of an electrolyte container, an electrolyte in said container, said container conformed to provide two chambers above the electrolyte therein, one of said chambers being sealed against communication with the atmosphere, an igniting device in said sealed chamber, electrodes immersed in the electrolyte arranged to generate a supply of gas in said sealed chamber and thus change the electrolyte levels in said chambers, means for periodically operating the igniting device to combine the gases collected in the aforesaid sealed chamber, a float in the other chamber, and means for holding the float in the highest position to which it is moved.

18. In an instrument for determining the maximum electrical demand of a circuit the combination of an electrolyte container, an electrolyte in said container, said container conformed to provide a sealed chamber above the level of the electrolyte therein, an igniting device in said chamber, electrodes in the electrolyte arranged to generate gases which collect in said chamber and thus change the level of the electrolyte, together with means for periodically operating the igniting device to combine the gases collected in said chamber, and means for registering the maximum change in electrolyte level due to the collection of gas in said chamber.

19. In an instrument for determining the maximum electrical demand of a circuit, the combination of an electrolyte container, an electrolyte in said container, said container conformed to provide two chambers above the electrolyte therein, one of said chambers being sealed against communication with the atmosphere, an igniting device in said sealed chamber, electrodes immersed in the electrolyte arranged to generate a supply of gas in said sealed chamber and thus change the electrolyte levels in said chambers, means for periodically operating the igniting device to combine the gases collected in the aforesaid sealed chamber, and means disposed in the other chamber operated when the level of the electrolyte in said chamber rises.

20. Apparatus of the class described comprising in combination an electrolyte container, an electrolyte therein, said container conformed to provide a sealed chamber above the level of the electrolyte therein, an igniter device located in said sealed chamber, electrodes immersed in the electrolyte below said chamber, means for controlling the actuation of the igniter device, and means for registering the greatest change in the electrolyte level within said container due to the formation of gas in said sealed chamber between successive operations of said igniter device.

21. Apparatus of the class described comprising in combination, an electrolyte container, an electrolyte therein, said container conformed to provide a sealed chamber above the level of the electrolyte therein, an igniter device located in said sealed chamber, electrodes immersed in the electrolyte below said chamber, means for controlling the actuation of the igniter device, and indicating means operated by the displacement of electrolyte due to the formation of gas in said chamber.

22. Apparatus of the class described comprising in combination an electrolyte container, an electrolyte therein, said container conformed to provide a sealed chamber above the level of the electrolyte therein, an igniter device located in said sealed chamber, an indicating device, and electrodes immersed in the electrolyte arranged to generate gas in said sealed chamber to displace the indicating device.

23. Apparatus of the class described comprising a U-shaped tube hermetically sealed at one end, an electrolyte in said tube, an igniter device located inside the sealed end of said tube, electrodes near the bottom of the sealed leg of said tube, circuit connections for maintaining a practically constant current flow between said electrodes, a pair of circuit terminals disposed within the unsealed end of said tube, the position of said circuit terminals determining the length of time intervals between actuations of the igniter device, and means for varying the positions of the terminals with respect to the normal electrolyte level.

24. The method of ascertaining the maximum consumption of electricity supply during a plurality of time intervals, which consists in decomposing a liquid electrolyte to form gases at a rate proportional to the consumption of energy, periodically igniting the gases thus formed to cause them to recombine in the form of liquid electrolyte, and measuring the greatest volume of gas created during any of said time intervals.

25. The method which consists in decomposing an electrolyte to form gases at a rate proportional to the consumption of electricity, igniting the gases thus formed at the end of each of a plurality of equal time intervals to cause the gases to recombine in the form of electrolyte, and ascertaining the greatest volume of gas created within any of said time intervals.

26. The method which consists in decomposing an electrolyte to form gases at a rate proportional to the consumption of electricity, successively igniting the gases thus formed to cause the gases to recombine in the form of electrolyte, and ascertaining the maximum ratio of the several successively formed volumes of gases to the periods of time in which said volumes of gases were produced.

In witness whereof, I hereunto subscribe my name this 12th day of June, A. D., 1913.

CHESTER I. HALL.

Witnesses:
ALBERT G. MCCALEB,
ALBIN C. AHLBERG.